(No Model.)  2 Sheets—Sheet 1.
H. TINDELL.
FEEDING MECHANISM FOR PICKING AND CARDING MACHINES.
No. 439,311.  Patented Oct. 28, 1890.
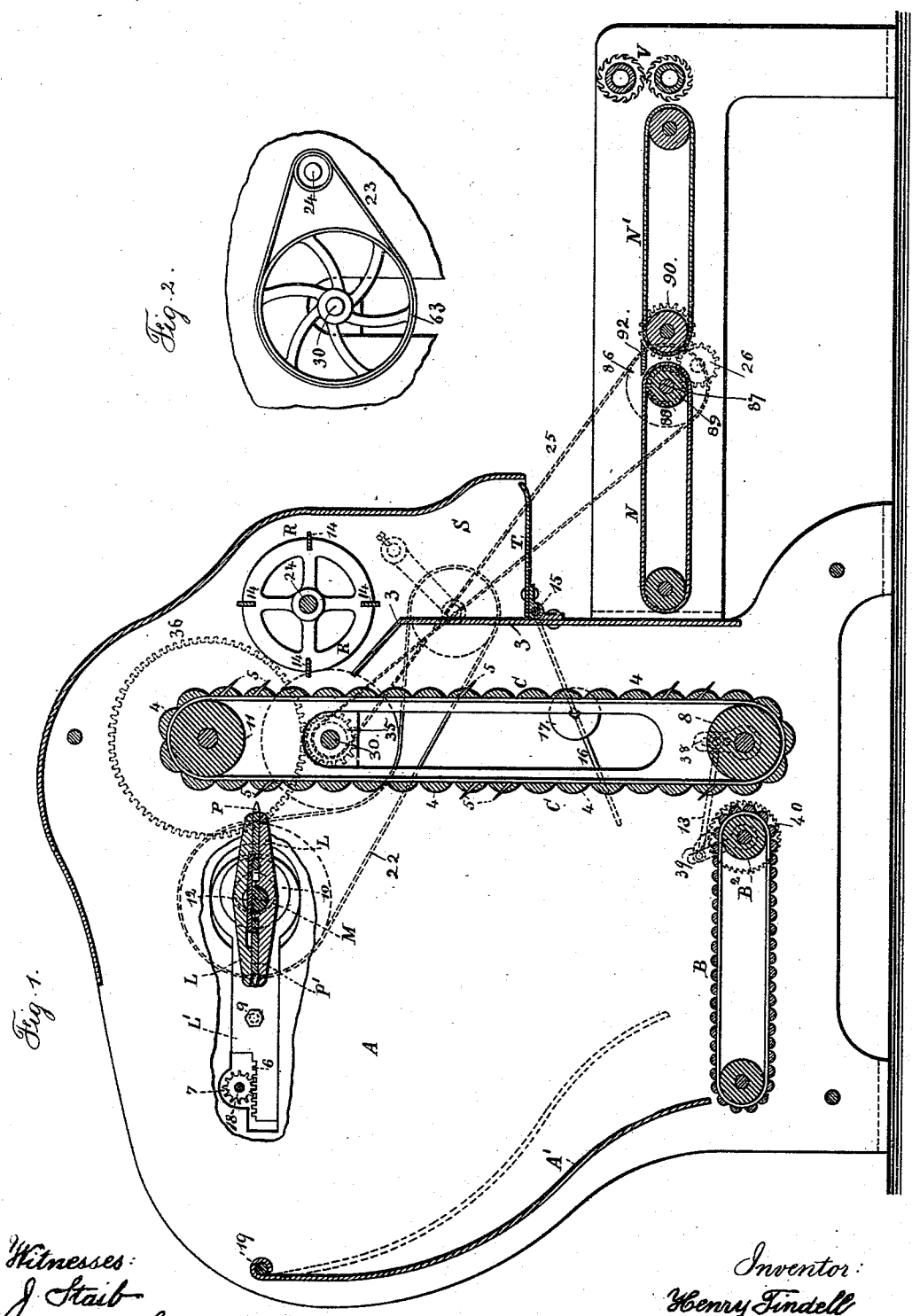

(No Model.) 2 Sheets—Sheet 2.
H. TINDELL.
FEEDING MECHANISM FOR PICKING AND CARDING MACHINES.
No. 439,311. Patented Oct. 28, 1890.
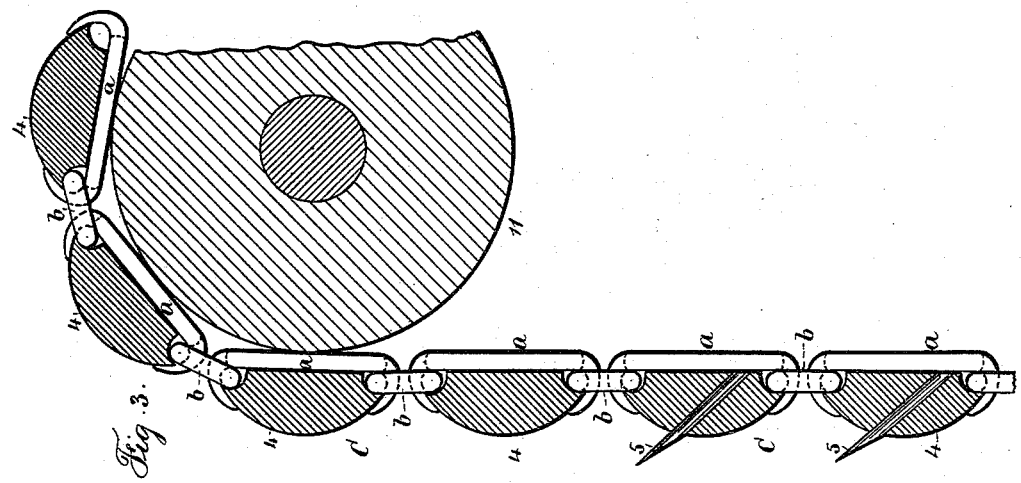
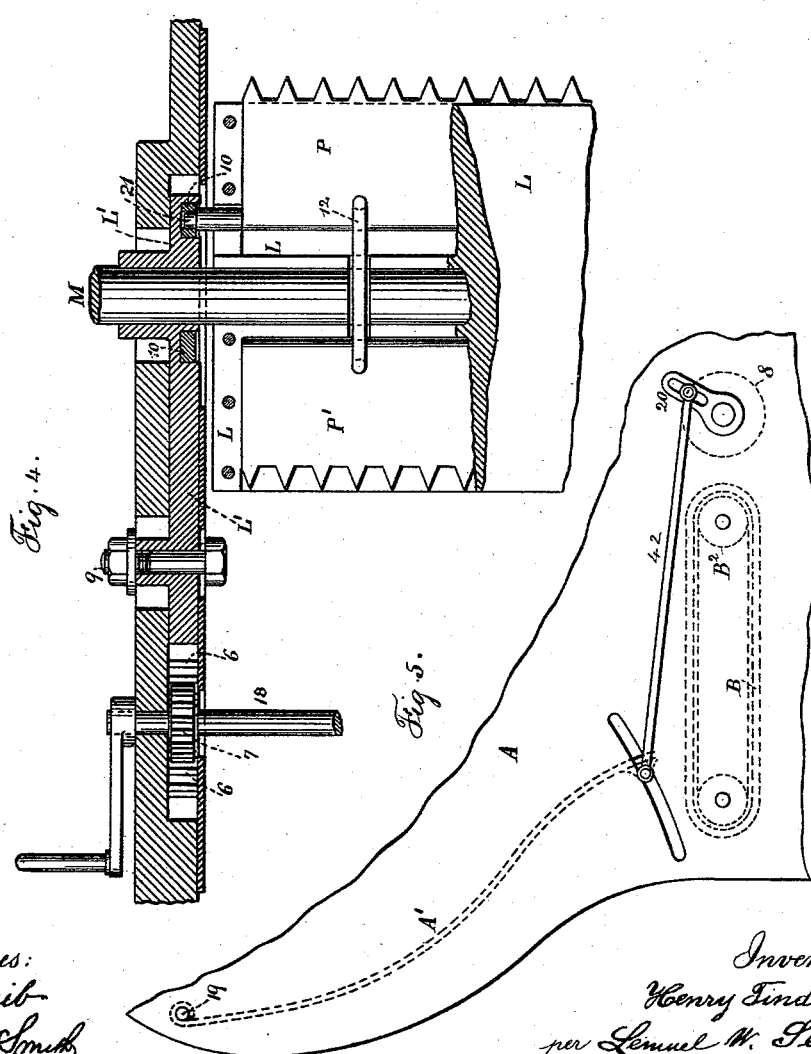
Witnesses:
J. Staib
Chas H. Smith
Inventor
Henry Tindell
per Lemuel W. Serrell
atty

UNITED STATES PATENT OFFICE.

HENRY TINDELL, OF HARRISON, NEW JERSEY.

FEEDING MECHANISM FOR PICKING AND CARDING MACHINES.

SPECIFICATION forming part of Letters Patent No. 439,311, dated October 28, 1890.

Application filed February 17, 1890. Serial No. 340,684. (No model.)

*To all whom it may concern:*

Be it known that I, HENRY TINDELL, a citizen of the United States, residing at Harrison, in the county of Hudson and State of New Jersey, have invented an Improvement in Feeding Mechanism for Picking and Carding Machines, &c., of which the following is a specification.

In Letters Patent No. 392,722, granted November 13, 1888, to L. F. Dickerson and H. Tindell, mechanism is represented for feeding to picking and carding machines. The present invention is an improvement upon the same, whereby the efficiency of the apparatus is increased.

In the drawings, Figure 1 is a longitudinal vertical section of the hopper and feeding mechanism, showing my present improvements. Fig. 2 shows the driving mechanism for the doffer. Fig. 3 is a section in larger size of the lifting-apron. Fig. 4 is a horizontal section of the mechanism for moving the beaters, and Fig. 5 is a diagram of the devices for swinging the curved side of the hopper.

A reference is hereby made to the aforesaid Patent No. 392,722 for the general description of the hopper A, the endless supply-apron B at the bottom of the same, the lifting-apron C, and the rollers 8 and 11 for the apron; but instead of making such lifting-apron C in the manner represented in the said patent I find it advantageous to associate the teeth of the apron in distinct rows or groups, as represented, because when the teeth are continuous and uniform upon the surfaces of the apron there is a combing action against the wool or similar material in the hopper, and there is little or no opportunity for the mass of fiber to come into direct contact with the surfaces of the slat 4.

By omitting the rows of teeth upon four or five of the slats and then providing such teeth on one or two of the slats the mass of fiber in the hopper is brought up against the slats themselves, and the rows or groups of teeth on the ascending side of the belt have opportunity to become entirely filled with the fiber and raise up such fiber uniformly in a separate mass, and this is advantageous, as the teeth are entirely filled and the quantity in each mass is nearly uniform, and when the fiber is knocked off the row or rows of teeth such fiber falls in a mass to the point of delivery, as hereinafter described. I find it also advantageous to make the slats convex and of wood, through which the pointed teeth pass, and I connect the slats one to another by metallic chains formed of clip-pieces $a$ and links $b$, the ends of the clip-pieces $a$ being sufficiently thin to be turned around and pressed down upon the convex surface of the slat, and the links are preferably long and straight, as shown, the edges of the slat 4, being recessed at the places where these links are introduced, or the edges of the slats are channeled all the way along, so as to form the necessary recesses for the reception of such links, and these clip-pieces and links form chains that connect the slats of the feeding-belt together, and it is preferable that these chains be applied near the ends of the slats, and when the slats are long they should also be used at one or two intermediate places, so that the belt may be firm and strong.

The stock L of the comb or beater P is mounted upon a shaft or axis M, that passes through the adjustable bearings L' upon the frame of the machine.

It is often necessary to adjust the stock L toward or from the lifting-apron C, according to the quantity of wool or other fiber allowed to remain upon the teeth 5, and to effect this the adjustable bearings L' for the shaft or axis M require to be moved longitudinally and horizontally an equal distance, and this is conveniently accomplished by providing teeth 6 upon the adjustable bearings L' and small pinions 7 upon a cross-shaft 18, and upon the end of this cross-shaft 18 there is a suitable lever or hand-wheel, so that by rotating this cross-shaft 18 more or less the shaft or axis M and the beaters are moved toward or from the lifting-apron and with uniformity at both ends. The clamp-screws 9, that pass through the adjustable bearings L' and through slots in the frame, can be tightened after the adjustment has been made.

Upon the inner face of each adjustable bearing L' is a ring 10, inserted in a recess that is eccentric to the opening receiving the axis M, and in this ring 10 is a hole for a stud 21 at the end of the beater P. Hence as the shaft M and stock L are revolved the beater P will be drawn in and out in consequence of the eccentricity of the rings 10 in the adjustable bearings at the ends of the stock L, and this movement will be parallel and without any sudden concussion or blow, because the rings 10 are rotated freely by the studs 21 as the stock L is revolved, and, in consequence of the rings 10 projecting or being eccentric from the axis M toward the lifting-apron C, the beater P will be projected toward the lifting-apron and will act to beat down the surplus hanks or masses of fiber as they are lifted upon the teeth 5.

Where a second beater P' is made use of, it is to be connected to the beater P by the rods or bolts 12, that pass freely through holes in the stock L and firmly connect such beaters P and P'. Hence as one beater is drawn into the stock the other beater will be projected, and these two beaters will be reliably and efficiently moved by the studs 21 on the beater P and the eccentric rings 10 in the adjustable bearings L'.

The rotary doffer R is made with heads or ends and the longitudinal parallel slats 14 fastened thereto, which slats act to discharge the wool from the teeth of the lifting-apron C, and it is advantageous to have these slats sufficiently narrow to prevent undue agitation of the atmosphere, so that any loose fibers will not be blown out of the machine, but will be simply discharged in separate masses or sections from the teeth on the lifting-apron, and said fiber will fall into the receiver S. One side of this receiver is formed by a vertical partition 3, with an inclined upper end, so that the wool-receptacle S is entirely separated from the descending ranges of teeth on the apron. The locks of wool as they fall rest upon the yielding weighted bottom T, that is pivoted at 15 and provided with arms 16 at one or both ends outside the frame. The arm 16 is provided with the weight or weights 17, and the weight 17 is to be so adjusted that the bottom T will yield and swing downwardly when the proper quantity of wool or other fiber has accumulated in the receiver S, and said fiber is delivered periodically upon the belt N, that conveys the same to the picking, carding, or other mechanism, and, in consequence of the pivot 15, on which the weighted bottom T swings, being at the partition 3, the mass of wool as it rolls off the bottom is delivered in the direction in which the belts N N' are moving, and I remark that it is advantageous for the arms 16 to be at a downward inclination of about twenty degrees, so that the bottom T will be returned rapidly to position below the receiver S as soon as the mass of fiber has been discharged from the same upon the belt N, and it will be apparent that as the bottom T swings downwardly the weight of the fiber will be nearer the moving edge of the bottom, and hence have greater leverage against the weight 17 for promoting a rapidity of movement in the discharge of the fiber.

It is preferable to make a double delivery apron or belt—that is to say, the fiber on the belt N is passed by that belt to the belt N', that intervenes between the belt N and the feed-rolls V, and the belt N is driven at a faster speed than the belt N' in order that the fiber may be pushed by the belt N upon the belt N' and form a uniform bat or layer without intervening spaces between the masses of fiber as delivered from the receiver.

This feeding device is well adapted for carding and picking machines, because the quantity fed in is so nearly uniform that it becomes unnecessary to weigh the fiber passing into the carding-machine, and the hanks of fiber are opened out to a considerable extent in this mechanism by the action of the beaters and the doffer. The wool or other fiber is preferably pressed against the lifting-apron by an intermittent operation in order that the wool may expand more or less between one pressure and the next, and thereby insure the entire filling of each range of teeth as they rise up; and with this object in view the supply-apron B receives an intermittent progressive movement by any suitable mechanism—such, for instance, as a slotted crank 38, with a connecting-rod 13 to a pawl 39, acting on a ratchet-wheel 40 on the shaft of the roll $B^2$, that moves the supply-apron. By moving the crank-pin nearer to or farther from the axis of the crank a greater or less movement is given to the supply-apron, according to the quantity of the wool or the condition of its use. The supply-apron and the curved side A' of the hopper serve as supports for the wool, and when an intermittent movement is given to one or both of them the feed is effected to the best advantage.

I have shown in Fig. 5 the supporting side A' of the hopper as hinged at 19 and its lower end connected by the rod 42 with the crank 20, so that the wool is pressed toward the lifting-apron intermittently for the purposes aforesaid.

The driving-shaft 30, pinion 35, and gear-wheel 36 to the shaft of the roller 11 are substantially as in the before-mentioned patent, and the apron C drives the roll 8. I have shown by dotted lines, Fig. 1, a belt 22 and pulleys for driving the shaft M of the beater P, and in Fig. 2 a belt 23 and pulley 63 on the driving-shaft 30 for giving motion to the shaft 24 of the rotary doffer R. The belts N N' may be driven by any suitable means. I have shown by dotted lines, Fig. 1, a belt 25 from a pulley on the shaft 30 to a pulley 86 on the shaft 87 of one roll 88 of the belt N and an adjacent small gear 89, meshing with an intermediate gear 26, that drives a larger gear 90 on one roll of the belt N'. As the wool is delivered in masses from the receiver S, the masses pass easily from the belt N to the belt N'; but any suitable plate or guard 92 may be used at the surface of the belts from one to the other.

In machines that have heretofore been made having either a vertical or nearly-vertical belt with teeth or having a cylinder with teeth the teeth are sufficiently close together for the wool or other fiber to form a continuous bat; but such bat is not of uniform thickness, because the locks of wool fill into some of the teeth more closely than into others. Hence the feeding operation effected by such belt or cylinder is not regular.

In my present improvements the teeth are grouped together in horizontal or nearly-horizontal ranges, the space between one range of teeth and the next adjacent range being sufficient for the wool to become entirely separated into short or sectional bats, and because the wool in the hopper is not exposed to a uniform combing action by the teeth, as heretofore usual, there is opportunity for the wool in the hopper to press up to the belt between one group of teeth and the next, so that the teeth penetrate the mass of wool and become entirely filled and the surplus is beaten off as the belt passes up adjacent to the beaters P, and the locks of wool that are not impaled upon the teeth are beaten back into the hopper, and the separation of one portion or section of the bat from the other is thus effected and the feed rendered much more uniform than in previous machines of this character.

I claim as my invention—

1. The combination, with the hopper and the supply-apron B, of a lifting-apron composed of slats hinged together, the rollers 8 and 11, over which such lifter-apron passes, and the teeth 5, projecting at an upward inclination from the slats, such teeth being applied to some of the slats and not to others, as set forth, so that the fiber in the hopper may come into contact with the slats of the lifting-apron between one row of teeth and the next and insure uniformity in the lifting action of the row of teeth, substantially as set forth.

2. The lifting-apron C, formed of slats, the metal clip-pieces a, with their ends bent over to hold the slats, and the links b, connecting the clip-pieces, the edges of the slats being recessed for the reception of the links, substantially as set forth.

3. The combination, with the stock L, its axis or shaft M, and the bearings L′, of the rings 10, surrounding the axis or shaft and supported on the bearings eccentrically to such axis or shaft, and the beater carried by the stock and having studs passing into holes in the rings for projecting and retracting the beater by the action of the eccentric rings, substantially as set forth.

4. The combination, with the stock L and its axis M, of the beaters P P′, passing into the stock at opposite edges thereof, and the rods or bolts 12, passing through holes in the stock and connecting the respective beaters, the studs 11, and rings 10, placed eccentric to the axis M and acting to project and retract the beaters, substantially as set forth.

5. The combination, with the lifting-apron C, stock L, and beaters P, of the doffer R, formed of narrow parallel slats between the ends or heads, and the receiver S, into which the wool or other fiber is transferred by the doffer, substantially as set forth.

6. The combination, with the lifter-apron C, stock L, and beaters P, of the doffer R, the receiver S, and a partition 3, separating the receiver from the apron, and into which receiver the wool or other fiber is discharged by the doffer, the yielding weighted bottom T, pivoted near the partition 3, and the apron or belt upon which the fiber is delivered periodically from the receiver S by the yielding of the bottom T, substantially as set forth.

7. The combination, in a wool-feeding mechanism, of a hopper for containing the wool, an elevating-apron of slats, teeth in the slats in groups or ranges and intermediate slats without teeth, and a beater acting to open the wool and force back into the hopper the locks that are not impaled upon the teeth and separate the wool upon one range of teeth from that upon the next, substantially as specified.

8. The combination, with a beater and upwardly-moving teeth in groups or ranges, of a hopper for containing the wool, having a movable side, and mechanism for giving to such movable side a swinging motion, whereby the wool is caused to pass in between one group or row of teeth and the next to cause the ascending teeth to pass into the fiber, so that the beater in knocking back into the hopper the locks that are not impaled upon the teeth will separate the bat into sections, substantially as set forth.

Signed by me this 8th day of February, 1890.

HENRY TINDELL.

Witnesses:
THOMAS C. PROVOST,
L. F. DICKERSON.